RE 25293

June 28, 1960      J. PICKLES      2,942,647

SLIDELESS SEAT SUPPORT AND ADJUSTING DEVICE

Filed Aug. 26, 1957      2 Sheets-Sheet 1

INVENTOR.
JOSEPH PICKLES
BY *Whittemore*
*Hulbert & Belknap*
ATTORNEYS

June 28, 1960  J. PICKLES  2,942,647
SLIDELESS SEAT SUPPORT AND ADJUSTING DEVICE
Filed Aug. 26, 1957  2 Sheets-Sheet 2

INVENTOR.
JOSEPH PICKLES
BY Whittemore,
Hulbert & Belknap
ATTORNEYS

United States Patent Office 2,942,647
Patented June 28, 1960

2,942,647
SLIDELESS SEAT SUPPORT AND ADJUSTING DEVICE

Joseph Pickles, Dearborn, Mich., assignor to Ferro Stamping Company, Detroit, Mich., a corporation of Michigan Filed Aug. 26, 1957, Ser. No. 680,305

19 Claims. (Cl. 155—14)

The present invention relates to a slideless seat support and adjusting device.

The present invention relates to the art of adjustable seat supports for automotive vehicles. At the present time so-called "six-way" adjustable seat supports are provided. These supports permit generally fore and aft movement of the seat support, generally vertical movement thereof, and forward and rearward tilting of the seat support about a longitudinal axis extending transversely of the vehicle.

In the past, seat constructions of this type have for the most part involved a track adapted to be fixed to the floor of the vehicle on which a slide was mounted for movement longitudinally of the track. The slide was connected to a seat supporting bar or similar element by linkage at the front and rear ends thereof, this linkage being independently adjustable to effect tilting of the seat and simultaneous adjustability to effect generally vertical movement thereof.

In accordance with the present invention the structure is simplified by providing only a stationary base member and a seat supporting bar member, these members being interconnected by suitable linkage designed to provide for substantially horizontal fore and aft movement, generally vertical height adjusting movement, and tilting accomplished by raising or lowering the front or rear end of the bar.

The linkage may have associated therewith suitable latch means effective to latch the linkage in adjusted position. However, in accordance with the present invention, it is preferred to provide power means including motor mechanism actuated to effect power seat adjustment and operable when at rest to retain the seat in the desired position of adjustment.

It is accordingly an object of the present invention to provide a seat adjusting and supporting device comprising a base, a seat support bar, and linkage interconnecting the base and bar for effecting six-way relative adjustment therebetween.

More specifically, it is an object of the present invention to provide a fixed base, a movable seat supporting bar, linkage interconnecting opposite ends of the base and bar, and power means connected to the linkage operable to effect power adjustment of the bar and to lock the bar in adjusted position.

It is a further object of the present invention to provide seat supporting and adjusting mechanism comprising a base having posts thereon, suspension links connected to said posts, guide links connected to said suspension links, bell crank levers connected to said guide links, and a seat supporting bar connected adjacent opposite ends to said bell cranks.

It is a further object of the present invention to provide mechanism as defined in the preceding paragraph which further comprises actuating and locking members connected to said bell cranks, and an actuating and locking member connected to one of said links.

It is a further object of the present invention to provide mechanism as described in the preceding paragraph in which said actuating and locking members are in the form of racks, and in which the actuating and locking members connected to said bell cranks are in mesh with independently rotatable pinions mounted on means carried by said bar.

It is a further object of the present invention to provide mechanism as defined in the preceding two paragraphs in which the actuating and locking member connected to one of said links comprises a rack in mesh with a pinion provided on means fixed with respect to said base.

Other objects and features of the invention will become apparent as the description proceeds, especially when taken in conjunction with the accompanying drawings, illustrating a preferred embodiment of the invention, wherein.

Referring now to the figures, there is shown a single device for supporting and adjusting a seat, as for example the front seat of an automobile. It will be appreciated that two such devices are provided and that these devices are connected to opposite ends of the seat.

Where the power means disclosed herein is employed, there my be drive connections to the devices at opposite ends of the seat. Alternatively, as is well understood in the art, torsion bars may be provided which extend transversely of the vehicle between the devices and interconnect corresponding parts.

As will later appear, the power actuating means preferably comprises rack and pinion drive means and the pinions may be independently driven by means including solenoid actuated clutches and flexible drive shafts all as clearly set forth in my prior copending application Serial No. 581,676, filed April 30, 1956 now Patent No. 2,886,094.

Figure 1:
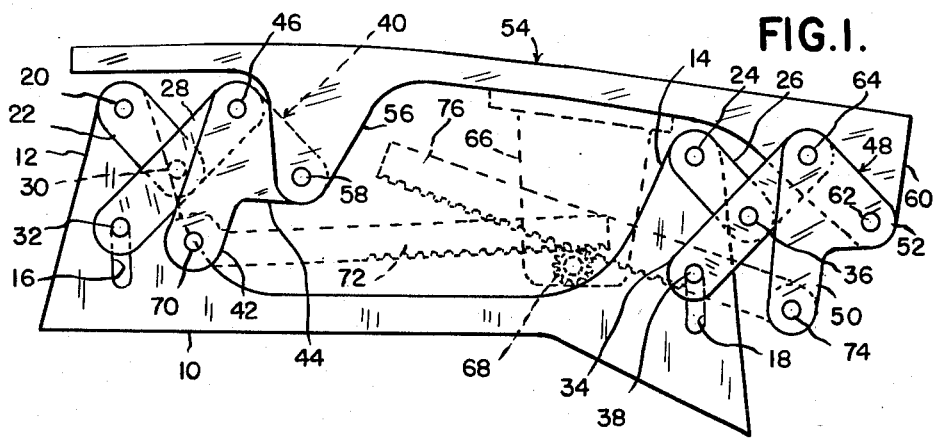
Figure 1 is a more or less diagrammatic elevational view of the seat supporting and adjusting mechanism with the seat supporting bar in its rearward and lowered position.

Referring now to the drawings, in Figure 1 the seat supporting and adjusting device comprises an elongated base 10 having at its forward end an upstanding post 12 and having a similar upstanding post 14 adjacent its opposite end. Disposed in the lower parts of the posts 12 and 14 are vertically elongated slots 16 and 18 respectively. Pivotally mounted, as indicated at 20, adjacent the top of the forward post 12 is a suspension link 22. Pivotally mounted, as indicated at 24, adjacent the upper end of the rear post 14 is a second suspension link 26.

A guide link 28 is provided which is pivoted intermediate its ends as indicated at 30, to the free end of the suspension link 22. The guide link 28 has adjacent one end thereof a pin 32 which is vertically slidable in the slot 16. A similar structure is provided at the rear of the device and comprises the guide link 34 pivoted as indicated at 36 to the suspension link 26 and having a pin 38 vertically slidable in the elongated slot 18. Adjacent the front of the device there is provided a bell crank lever 40 having a relatively long depending arm 42 and a relatively shorter arm 44. The bell crank is pivoted intermediate its ends as indicated at 46, to the upper end of the guide link 28. A similar bell crank 48 is provided adjacent the rear of the device having a relatively longer arm 50 and a relatively shorter arm 52.

An elongated bar 54 is provided which is adapted to be connected to one end of the seat or which in some instances may be a portion of a seat construction. In any case, the bar 54 adjacent its forward end has a depending leg 56 pivoted as indicated at 58 to the relatively shorter arm 44 of the bell crank 40. In like manner, the bar 54 has at its rearward end a depending leg portion 60 pivoted as indicated at 62 to the relatively shorter arm 52 of the bell crank 48. The bell crank 48 is pivoted intermediate its ends, as indicated at 64, to the upper end of the guide link 34.

With the parts in the position shown in Figure 1, it will be observed that the relatively shorter arms 44 and 52 of the bell cranks 40 and 48 extend downwardly from the pivot connections 46 and 64 respectively and hence, that the bar 54 is in its lowermost position. It will further be observed that the suspension links 22 and 26 extend rearwardly or to the right so that the bar in addition is in its rearmost position.

Suitable mechanism is connected to the devices for effecting power actuation thereof and for retaining the parts in adjusted position. In order to simplify the drawings this mechanism is shown in part in Figure 1 and in part in Figure 2 and has been omitted from the remainder of the figures. Referring first to Figure 1, there is provided a housing 66 extending downwardly from the bar 54 and including drive mechanism which terminates in a pair of drive pinions, one of which is indicated at 68. The relatively longer arm 42 of the bell crank 40 has pivotally connected thereto at 70 a rack 72 the teeth of which are in mesh with the pinion 68. Assuming for the moment that the links 22, 26, 28 and 34 are stationary, it will be apparent that actuation of the pinion 68 in a clockwise direction will draw the rack 72 to the right, swinging arm 44 of the bell crank 40 upwardly and thus raising the front end of the bar 54.

The relatively longer arm 50 of the bell crank 48 has pivoted thereto, as indicated at 74, a rack 76 having teeth which mesh with a second pinion coaxial with the pinion 68 but which is not illustrated in the figure. It will be understood that the two pinions are independently rotatable by suitable mechanism such for example as that shown in my prior copending application identified above. It will be observed that with the suspension linkage stationary, rotation of the pinion in mesh with the rack 76 in a clockwise direction will shift the rack 76 longitudinally to the right and will swing the bell crank 48 in a counterclockwise direction, thus lifting the rear end of the bar 54.

Figure 4:
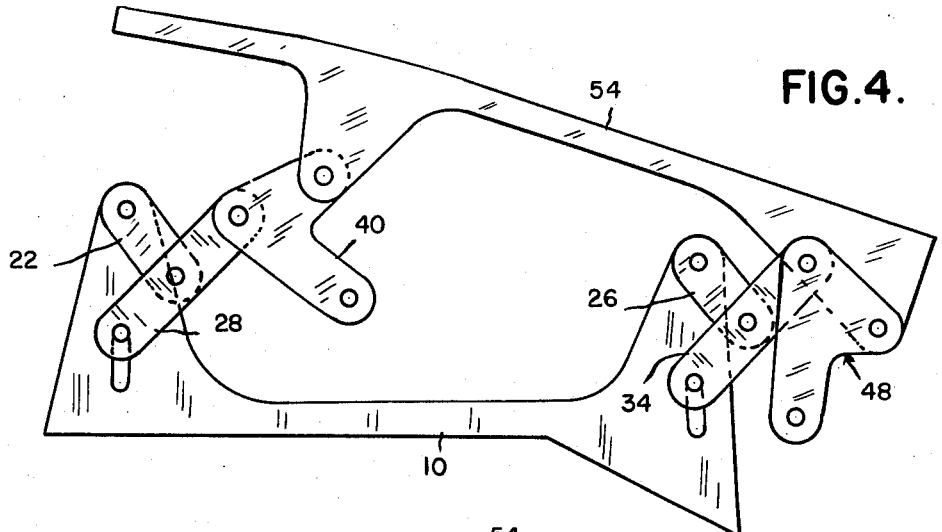
Figure 4 is a view of the device shown in Figure 1 with the seat supporting bar in its rerawardly tilted position.

It will of course be apparent that if the two pinions in mesh with the racks 72 and 76 are rotated simultaneously in a clockwise direction from the position illustrated in Figure 4, both the front and rear ends of the bar 54 will be raised.

Figure 2:
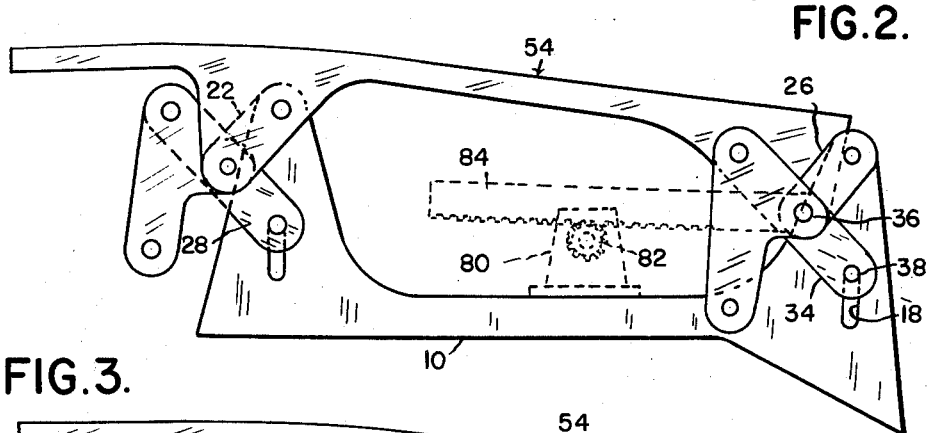
Figure 2 is a view of the device shown in Figure 1 with the seat supporting bar in its forward and lowered position.

Referring now to Figure 2, there is illustrated a second housing 80 which includes drive mechanism terminating in a pinion 82 in mesh with a rack 84 having one end pivoted to the pivot connection 36 between the guide link 34 and the suspension link 26. It will be apparent that clockwise rotation of the pinion 82 will shift the rack 84 to the right from the position shown in Figure 2 and will move the suspension link 26 from the position shown in Figure 2 to the position shown in Figure 1. This motion takes place in a manner controlled by the guide link 34 whose pin 38 moves vertically in the slot 18. Movement is thus imparted to the bar 54 with corresponding movement of the front suspension link 22 and guide link 28.

In Figure 2 it is thus observed that the bar 54 is in its most forward position and at the same time remains in its lowered position.

It may be mentioned at this time that movement of the bar 54 as the result of actuation of the pinion 82 is substantially horizontal due to the particular linkage resulting from the illustrated arrangement of the suspension link 22 and the guide link 28.

Figure 3:
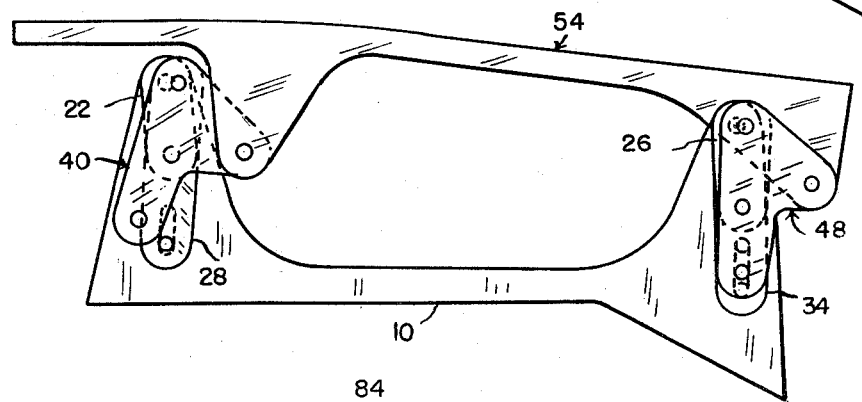
Figure 3 is a view of the device shown in Figure 1 with the seat supporting bar in its intermediate position.

In Figure 3 the drive mechanism has been omitted for clarity and the bar 54 is illustrated in an intermediate position from front to rear and in a fully lowered position.

In Figure 4 the bar 54 is illustrated in a forward tilted position relative to the base 10. This position of the bar 54 has been brought about by rocking of the bell crank 40 to its illustrated position from the position illustrated in Figure 1, without movement of the linkage including the suspension links 22 and 26 and the guide links 28 and 34.

Figure 5:
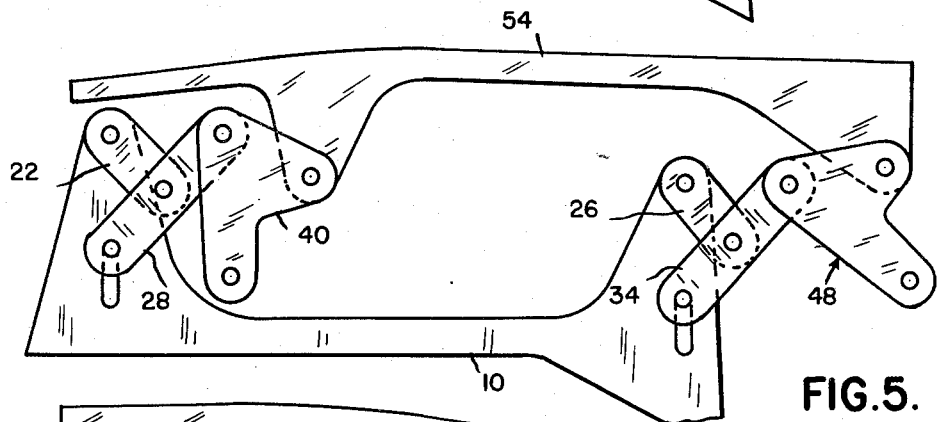
Figure 5 is a view of the device shown in Figure 1 with its seat supporting bar in its forwardly tilted position.

In Figure 5 the bar 54 is illustrated in a forwardly tilted rear position relative to the base 10 brought about by rocking of the bell crank 48 from the position shown in Figure 1 while maintaining the suspension links 22 and 26 and the guide links 28 and 34 as well as the bell crank 40 motionless. Thus, the rear end of the bar 54 has been raised.

Figure 6:
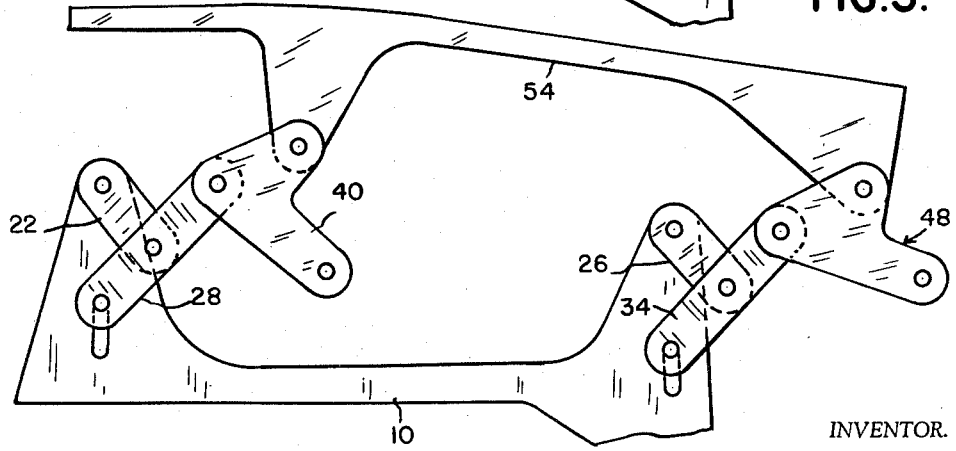
Figure 6 is a view of the device shown in Figure 1 with its seat supporting bar in its rearward raised position.

In Figure 6 there is illustrated the relative position of parts when the bar 54 is in its fully raised rearward position relative to the base 10. It will be observed that the suspension links 22 and 26 and the guide links 28 and 34 are in the position corresponding to the rearward position of the seat. The bar has been moved to its elevated position by swinging movement of both the bell cranks 40 and 48 counterclockwise from the position shown in Figure 1 with resultant upward movement of both the front and rear ends of the bar 54.

The foregoing illustrates only some of the positions and it will of course be apparent that the bar 54 may be tilted forwardly or rearwardly with the suspension linkage in position corresponding to forward position of the seat supporting bar 54.

Figure 7:
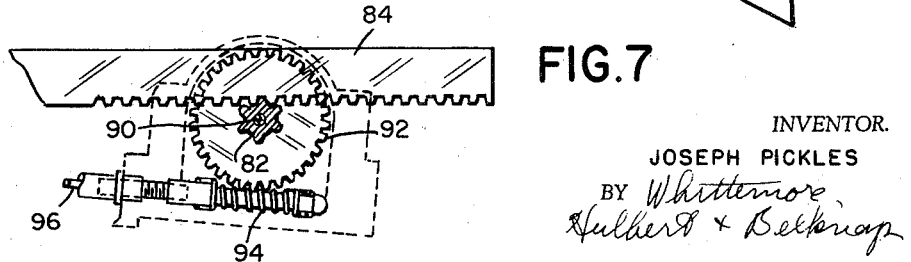
Figure 7 is a fragmentary elevational view showing the power actuating means.

Referring now to Figure 7 there is shown a detail of the power drive or actuating mechanism. In this figure one of the racks, as for example the rack 84, is shown as in mesh with the driving pinion 82. The pinion 82 is carried by a shaft 90 keyed or otherwise rigidly secured to a worm gear 92 adapted to be driven in forward and reverse directions by a worm 94 which is connected to a reversible electric motor (not shown) by suitable transmission means such as a flexible driving cable indicated more or less diagrammatically at 96. The worm and worm gear combination is designed to be irreversible so that when the worm is not being driven by the electric motor to which it is connected, it effectively locks the pinion 82 against rotation. Of course, the rack 84 is thus prevented from having substantial endwise or longitudinal movement although it may rock about the associated pinion as required by the particular linkage.

The specific bell cranks shown herein have arms disposed at an acute angle to each other. It will be understood however, that the term encompasses levers in which the arms may be at right or obtuse angles to each other or may extend in the same line, and in the same or opposite direction from the pivot thereof.

The drawings and the foregoing specification constitute a description of the improved slideless seat support and adjusting device in such full, clear, concise and exact terms as to enable any person skilled in the art to practice the invention, the scope of which is indicated by the appended claims.

What I claim as my invention is:

1. A slideless seat supporting and adjusting device comprising a base having posts at opposite ends, suspension links pivoted at one of their ends to said posts, guide links pivoted intermediate their ends to the other ends of said suspension links, vertical slots in said posts, means on one of the ends of said guide links slidably received in said slots, bell crank levers pivoted intermediate their ends to the other ends of said guide links, a bar pivoted adjacent its ends to first ones of the arms of said bell crank levers, means for securing said bar in adjusted position comprising separate elongated members pivoted to the other arms of said bell crank levers, and means on said bar for securing said members against relative motion with respect thereto.

2. A slideless seat supporting and adjusting device comprising a base having posts at opposite ends, suspension links pivoted at one of their ends to said posts, guide links pivoted intermediate their ends to the other ends of said suspension links, vertical slots in said posts, means on one of the ends of said guide links slidably received in said slots, bell crank levers pivoted intermediate their ends to the other ends of said guide links, a bar pivoted adjacent its ends to first ones of the arms of said bell crank levers, means connected between said bar and one of said bell crank levers to prevent substantial motion of said one bell crank lever relative to said bar, an elongated member pivoted to the other arm of the other of said bell crank levers, and actuating means on said bar securing said member to move said member longitudinally to swing said other bell crank lever on said bar.

3. A slideless seat supporting and adjusting device comprising a base having posts at opposite ends, suspension links pivoted at one of their ends to said posts, guide links pivoted intermediate their ends to the other ends of said suspension links, vertical slots in said posts, means on one of the ends of said guide links slidably received in said slots, bell crank levers pivoted intermediate their ends to the other ends of said guide links, a bar pivoted adjacent its ends to first ones of the arms of said bell crank levers, means for securing said bar in adjusted position comprising separate elongated members pivoted to the other arms of said bell crank levers, means on said bar for securing said members against substantial relative motion with respect thereto, an elongated member pivoted to one of said links, and means on said base for securing said last mentioned member against relative motion with respect thereto.

4. A slideless seat supporting and adjusting device comprising a base having posts at opposite ends, suspension links pivoted at one of their ends to said posts, guide links pivoted intermediate their ends to the other ends of said suspension links, vertical slots in said posts, means on one of the ends of said guide links slidably received in said slots, bell crank levers pivoted intermediate their ends to the other ends of said guide links, a bar pivoted adjacent its ends to first ones of the arm of said bell crank levers, an elongated member pivoted to the other arm of one of said bell crank levers, means on said bar securing said member against substantial relative motion with respect thereto, an elongated member pivoted to one of said links, and means on said base for securing said last mentioned member against relative motion with respect thereto.

5. A slideless seat supporting and adjusting device comprising a base having posts at opposite ends, suspension links pivoted at one of their ends to said posts, guide links pivoted intermediate their ends to the other ends of said suspension links, vertical slots in said posts, means on one of the ends of said guide links slidably received in said slots, bell crank levers pivoted intermediate their ends to the other ends of said guide links, a bar pivoted adjacent its ends to first ones of the arms of said bell crank levers, means for moving said bar to adjusted position comprising an elongated member pivoted to the other arm of one of said bell crank levers, means on said bar driving said elongated member longitudinally to effect vertical movement of the ends of said bar.

6. A slideless seat supporting and adjusting device comprising a base having posts at opposite ends, suspension links pivoted at one of their ends to said posts, guide links pivoted intermediate their ends to the other ends of said suspension links, vertical slots in said posts, means on one of the ends of said guide links slidably received in said slots, bell crank levers pivoted intermediate their ends to the other ends of said guide links, a bar pivoted adjacent its ends to first ones of the arms of said bell crank levers, means for moving said bar to adjusted position comprising elongated members pivoted to the other arms of said bell crank levers, means on said bar driving said elongated members longitudinally to effect vertical movement of the ends of said bar, another elongated member pivoted to one of said links, and means on said base for driving said other elongated member longitudinally to move said bar horizontally.

7. A slideless seat supporting and adjusting device comprising a base having posts at opposite ends, suspension links pivoted to said posts, a bar, bell crank levers having arms pivoted to opposite ends of said bar, and guide links having pin and slot connections to said posts supporting said bell crank levers from said suspension links for substantially horizontal movement relative to said base.

8. A slideless seat supporting and adjusting device comprising a base having posts at opposite ends, suspension links pivoted to said posts, a bar, bell crank levers having arms pivoted to opposite ends of said bar, guide links having pin and slot connections to said posts supporting said bell crank levers from said suspension links for substantially horizontal movement relative to said base, and independently operable power means for adjusting said bell crank levers.

9. A slideless seat supporting and adjusting device comprising a base having posts at opposite ends, suspension links pivoted to said posts, a bar, bell crank levers having arms pivoted to opposite ends of said bar, guide links having pin and slot connections to said posts supporting said bell crank levers from said suspension links for substantially horizontal movement relative to said base, and power means for swinging said suspension links in synchronism.

10. A slideless seat supporting and adjusting device comprising a base having posts at opposite ends, suspension links pivoted to said posts, guide links pivoted to said suspension links and having means slidable in vertical slots in said posts, bell cranks pivoted to said guide links, a bar pivoted at opposite ends to said bell cranks, motor means carried by said bar, drive means connecting said motor means to said bell cranks, and motor means fixed with respect to said base, a drive member connecting said last mentioned motor means to one of said links.

11. A slideless seat supporting and adjusting device comprising a base having posts at opposite ends, suspension links pivoted to said posts, guide links pivoted to said suspension links and having means slidable in vertical slots in said posts, bell cranks pivoted to said guide links, a bar pivoted at opposite ends to said bell cranks, motor means carried by said bar, separate drive members connecting said motor means to said bell cranks, and motor means fixed with respect to said base, a drive member connecting said last mentioned motor means to one of said links.

12. Structure as defined in claim 11 in which said drive members are racks and in which said motor means include pinions in mesh with said racks.

13. A seat supporting device comprising a base having posts at opposite ends thereof, a seat supporting bar, bell cranks having legs connected to said bar adjacent opposite ends thereof, linkage connected between said posts and bell cranks and supporting said bell cranks for substantially horizontal movement parallel to said base, power means for selectively actuating said linkage to effect fore and aft adjustment of said bar and angular movement of said bell cranks in any position of said linkage to effect vertical movement of said bar.

14. Structure as defined in claim 13 in which said power means includes independent means connected to said bell cranks for effecting separate movements thereof to tilt said bar or combined movements thereof to raise and lower said bar.

15. Structure as defined in claim 14 in which the power means includes rack and pinion mechanism including means for locking the pinion against rotation after adjustment to hold the bar in adjusted position.

16. A seat supporting device comprising a base having spaced posts thereon, a seat support bar, bell cranks having legs connected to said bar adjacent opposite ends thereof, linkage connected between said posts and bell cranks supporting said bell cranks for substantially horizontal movement parallel to said base, first power means connected between said base and said bar effective to move said bar and bell cranks substantially horizontally to effect fore and aft seat adjustment, second power means connected between said bar and one of said bell cranks to swing said one bell crank relative to said bar to effect vertical adjustment of the adjacent end of said bar, and third power means connected between said bar and the other of said bell cranks to swing said other bell crank relative to said bar to effect vertical adjustment of the adjacent end of said bar.

17. A seat supporting device comprising a base having spaced posts thereon, a seat support bar, bell cranks having legs connected to said bar adjacent opposite ends thereof, linkage connected between said posts and bell cranks supporting said bell cranks for substantially horizontal movement parallel to said base, first power means connected between said base and said bar effective to move said bar and bell cranks substantially horizontally to effect fore and aft seat adjustment, second power means connected between said bar and one of said bell cranks to swing said one bell crank relative to said bar to effect vertical adjustment of the adjacent end of said bar, and third power means connected between said bar and the other of said bell cranks to swing said other bell crank relative to said bar to effect vertical adjustment of the adjacent end of said bar, said power means including mechanical drive elements, and means for locking said drive elements in adjusted position.

18. A seat supporting device comprising a base having spaced posts thereon, a seat support bar, bell cranks having legs connected to said bar adjacent opposite ends thereof, linkage connected between said posts and bell cranks supporting said bell cranks for substantially horizontal movement parallel to said base, first power means connected between said base and said bar effective to move said bar and bell cranks substantially horizontally to effect fore and aft seat adjustment, second power means connected between said bar and one of said bell cranks to swing said one bell crank relative to said bar to effect vertical adjustment of the adjacent end of said bar, and third power means connected between said bar and the other of said bell cranks to swing said other bell crank relative to said bar to effect vertical adjustment of the adjacent end of said bar, said power means including elongated rigid drive elements, selectively operable means for moving said elements longitudinally and effective when inactive to retain said elements against substantial longitudinal movement.

19. A seat supporting device comprising a base having spaced posts thereon, a seat support bar, bell cranks having legs connected to said bar adjacent opposite ends thereof, linkage connected between said posts and bell cranks supporting said bell cranks for substantially horizontal movement parallel to said base, first power means connected between said base and said bar effective to move said bar and bell cranks substantially horizontally to effect fore and aft seat adjustment, second power means connected between said bar and one of said bell cranks to swing said one bell crank relative to said bar to effect vertical adjustment of the adjacent end of said bar, third power means connected between said bar and the other of said bell cranks to swing said other bell crank relative to said bar to effect vertical adjustment of the adjacent end of said bar, said power means including a pinion mounted on said base, a pair of independently operable pinions on said bar, racks in mesh with said pinions, and irreversible drive means connected to each of said pinions.

References Cited in the file of this patent

UNITED STATES PATENTS

| | | |
|---|---|---|
| 1,664,129 | Pallenberg | Mar. 27, 1928 |
| 2,527,111 | Widrich | Oct. 24, 1950 |